Figure 1:
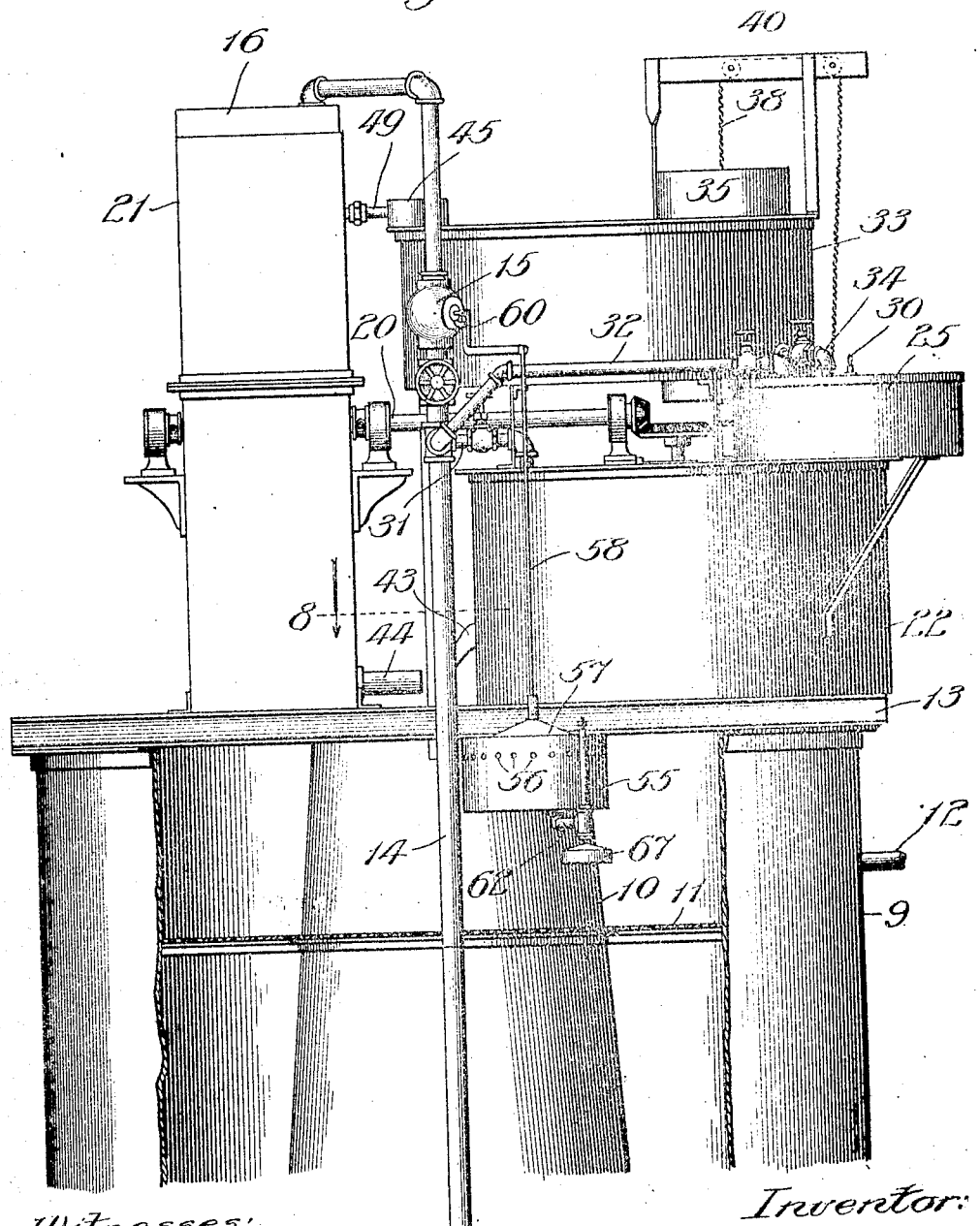

W. McA. BRUCE.
WATER SOFTENING APPARATUS.
APPLICATION FILED AUG. 21, 1908.

912,802.

Patented Feb. 16, 1909.
5 SHEETS—SHEET 1.

Witnesses:
John Enders
Chas. H. Buell

Inventor:
William McAfee Bruce
By Dyrenforth, Lee, Chritton & Wiles
Attys.

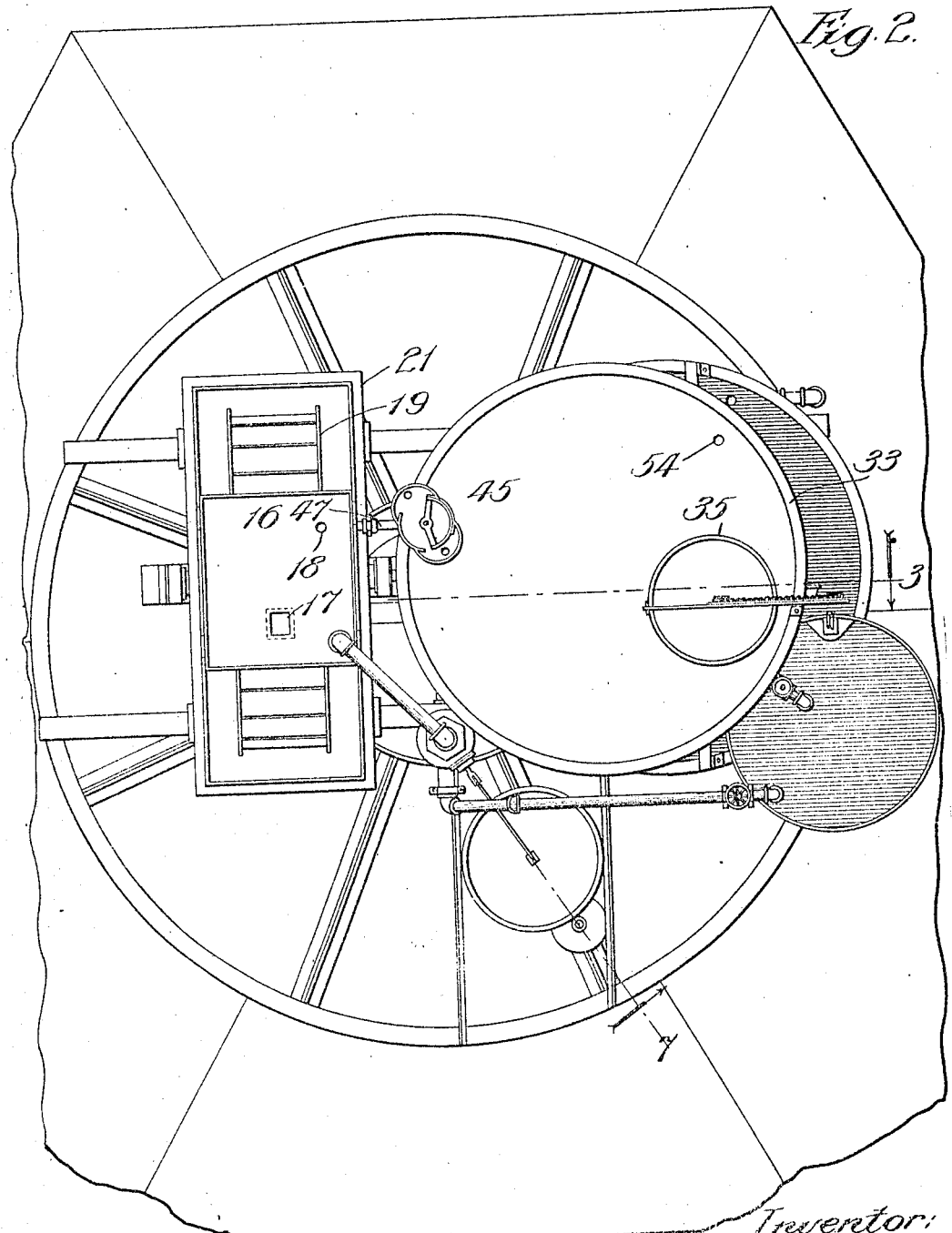

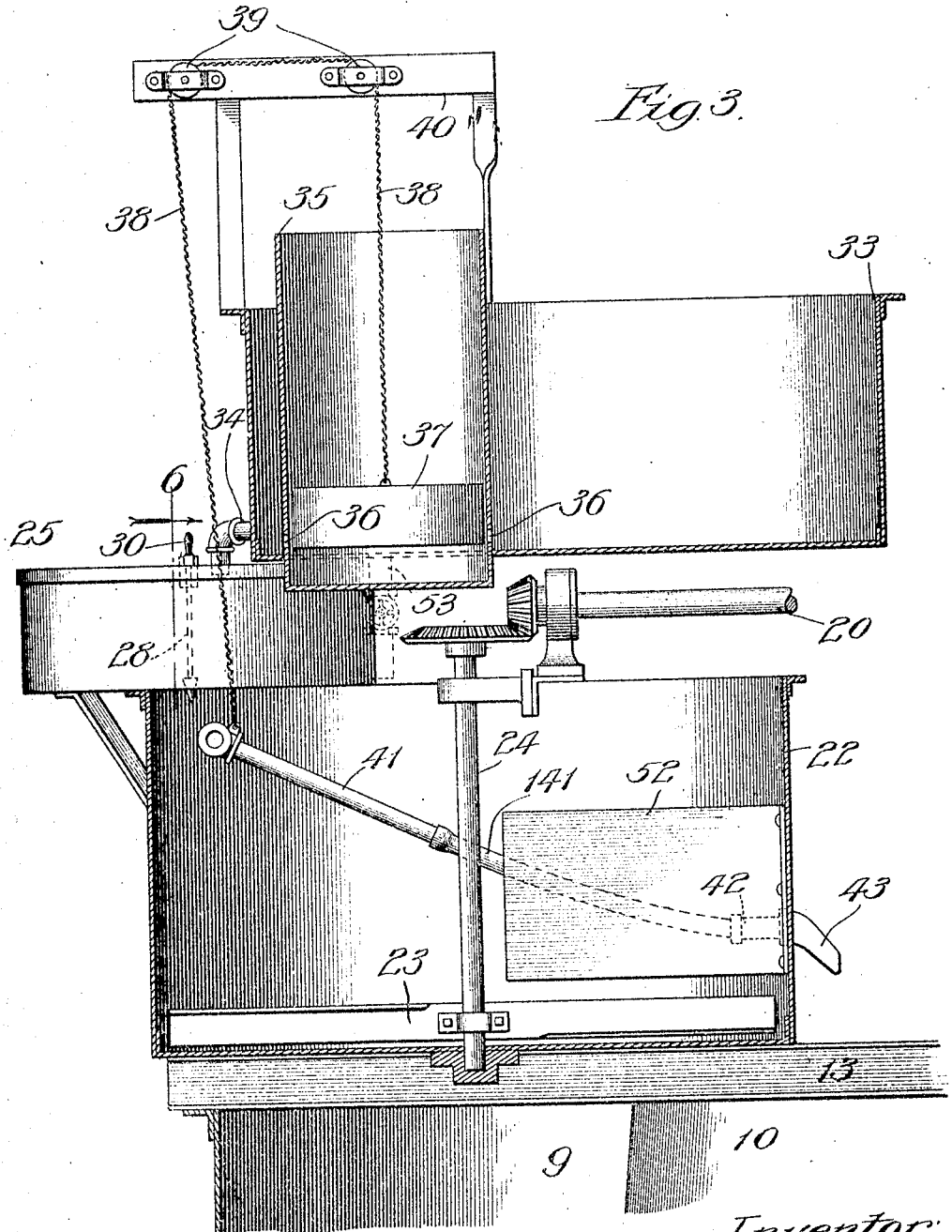

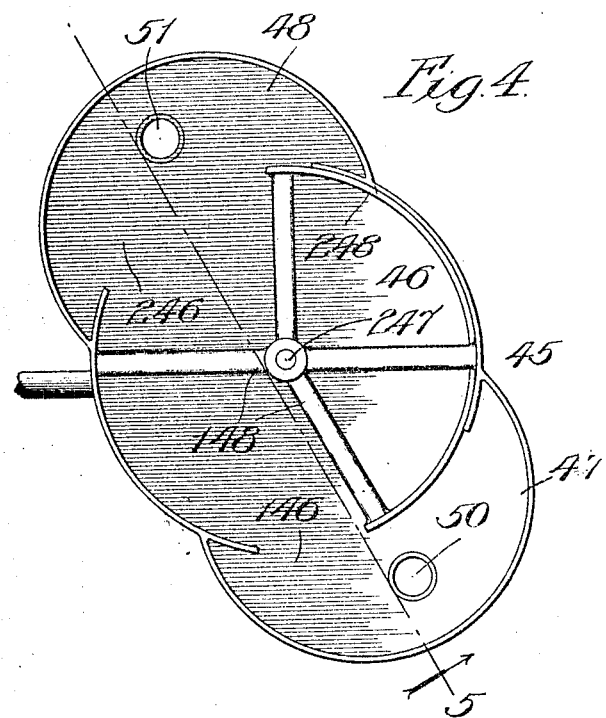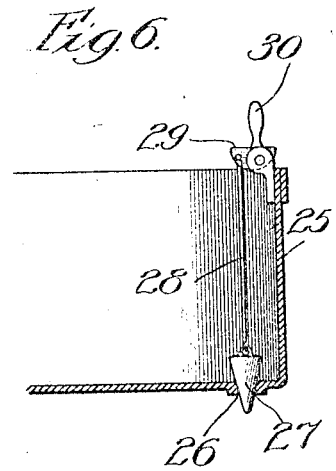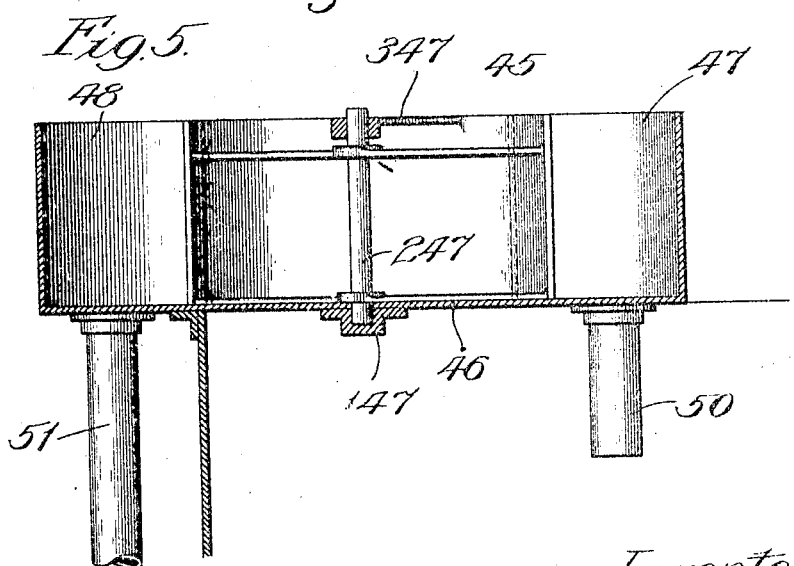

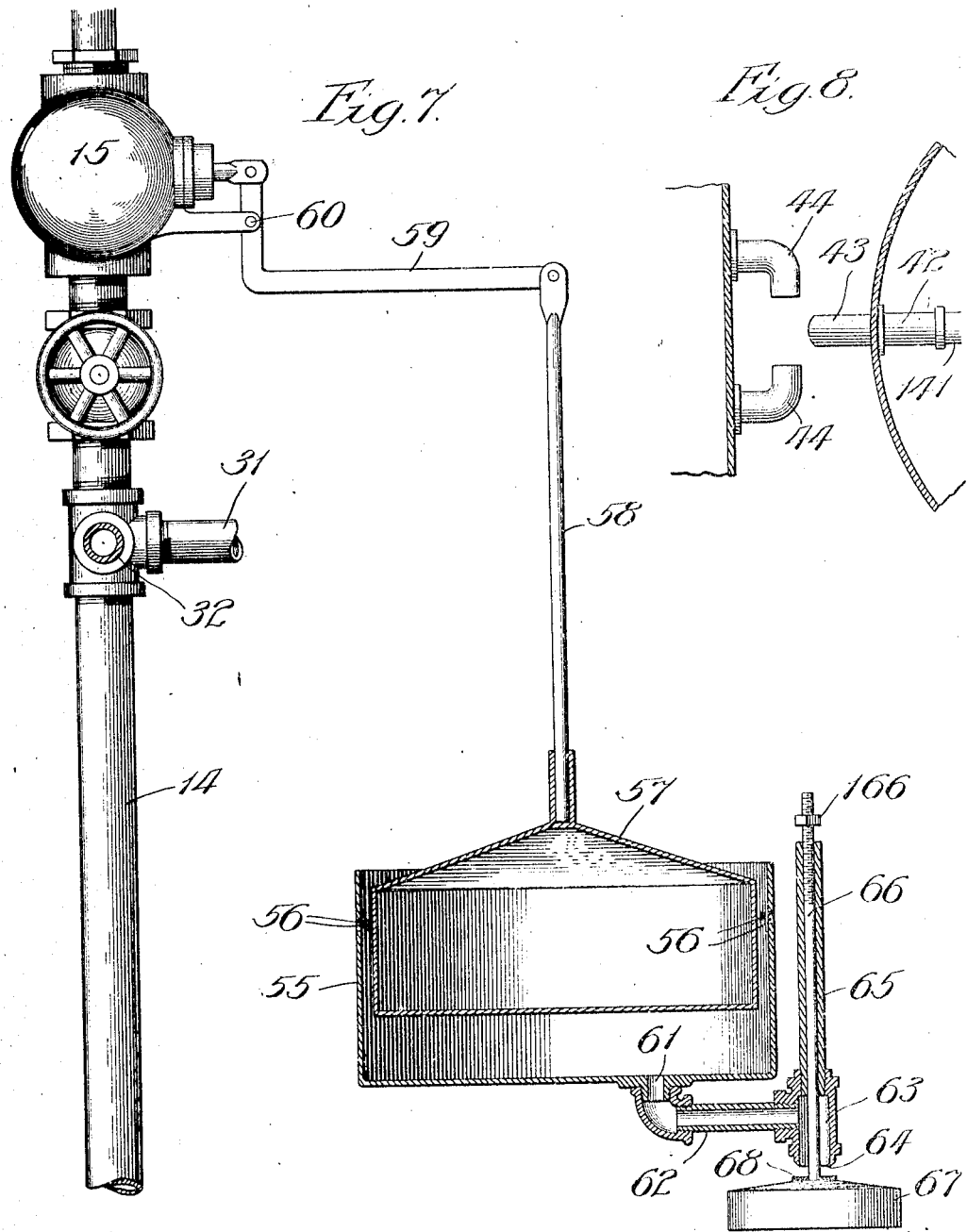

UNITED STATES PATENT OFFICE.

WILLIAM McAFEE BRUCE, OF CHICAGO HEIGHTS, ILLINOIS, ASSIGNOR TO KENNICOTT WATER-SOFTENER COMPANY, OF CHICAGO, ILLINOIS, A CORPORATION OF ILLINOIS.

WATER-SOFTENING APPARATUS.

No. 912,802.        Specification of Letters Patent.        Patented Feb. 16, 1909.

Application filed August 21, 1908. Serial No. 449,642.

*To all whom it may concern:*

Be it known that I, WILLIAM McAFEE BRUCE, a citizen of the United States, residing at Chicago Heights, in the county of Cook and State of Illinois, have invented a new and useful Improvement in Water-Softening Apparatus, of which the following is a specification.

My invention relates, particularly, to improvements in the mechanism commonly employed in industrial water-purifying apparatus, and surmounting the precipitating or settling tank, for automatically proportioning to the supply of water to be treated the chemical used for treating it by mixture therewith in its course to the tank.

In the accompanying drawings, Figure 1 is a view in side elevation of the apparatus containing my improvements surmounting a settling tank, shown broken; Fig. 2 is a plan view of the same; Fig. 3 is an enlarged section through a part of the apparatus on line 3, Fig. 2; Fig. 4 is an enlarged plan view of a weir-detail; Fig. 5 is a section on line 5, Fig. 4; Fig. 6 is an enlarged broken section on line 6, Fig. 3, showing a tapering-stopper detail; Fig. 7 is an enlarged broken section on line 7, Fig. 2, showing a supplemental-float device for the settling tank and its connection with the shut-off valve in the hard-water supply-pipe, and Fig. 8 is a broken enlarged section on line 8, Fig. 1, showing the preferred arrangement for mixing the chemical solution and hard water as they flow from their discharging spouts.

The precipitating tank 9 is one of known construction containing a downwardly flaring downtake-conduit 10 and strainer 11 and provided with an overflow at 12 from which to take the softened water for use; and I-beams 13 are shown extending across the top of the tank to support the mechanism for proportioning to the hard water to be treated the chemical or chemicals for treating it—usually lime, soda-ash, or copperas in solution, or two or all of these chemicals. The hard water is supplied through a vertical pipe 14 containing a balanced shut-off valve 15, of ordinary or any suitable construction. This pipe discharges into a water-box 16 containing in its bottom a relatively large outlet-opening 17 and a smaller outlet-opening 18 (Fig. 2) and seating over an overshot-waterwheel 19 on a shaft 20 journaled in bearings on the opposite sides of the wheel-casing 21 imposed on the rails 13 to surmount the settling-tank, as is also a solution-holder 22 containing the usual stirrer 23 having its upright shaft 24 geared to the waterwheel-shaft 20 to cause the wheel, by rotation, to drive the stirrer in the solution to maintain the charge thereof of uniform strength.

A lime-slaking box 25 is supported upon the open top of the holder 22 and is suitably braced in its position, as represented; and it contains a discharge-opening 26 (Fig. 6) in its bottom, closed by a tapering plug-valve 27 on a pivotal stem 28 connected with a lever 29 having a handle 30 and fulcrumed on the box 25. Valved branch-pipes 31 and 32 lead from the water-pipe 14 respectively to the holder 22 and lime-slaker 25 to supply them with the necessary water for their several purposes.

With the exception of the box 16 and its coöperative relation to parts hereinafter referred to, the parts thus far described need involve no features of novelty.

At 33 is represented a tank or box (which, for reasons hereinafter explained, I call the regulating-box), having an open top and supported in position to overlap the top of the lime-slaker 25, into which it may be caused to discharge through a valved spout 34. In this box, near one side thereof and protruding through its bottom and above its top, is a well 35 communicating from near its base, as through perforations 36, with the interior of the box 33 near the bottom thereof and containing a float 37. This float is connected by a chain 38, passing over pulleys 39, 39 on a superstructure 40 rising from the box 33, with the free end of a lift-pipe 41 vertically movable in the solution-holder 22 and communicating at its opposite end near the base of the holder with an outlet-section 42 terminating in a discharge-spout 43 extending, by preference, between two similar spouts 44, 44 forming the discharge for the hard water from the base of the wheel-casing 21 and deflected to oppose their mouths in the same plane with the spout 43 which discharges between them (Fig. 8).

The pipe 41 is shown in Fig. 3 to contain a hose-connection 141 with the pipe-section 42, to render it flexible; and it operates to feed the solution to the hard water in the well-known general way of the lift-pipe of Letters Patent No. 708,717, to C. L. Kennicott, dated September 9, 1902, though without, in this instance, proportioning the feed by varying the head over the lift-pipe.

The regulating box is preferably surmounted by a relatively small box 45 which, because of its function hereinafter explained, I call a dividing-box. Its preferred construction is that shown (Figs. 4 and 5) of a weir comprising a central circular compartment 46 containing diametrically opposite openings 146 and 246 in its walls and leading, respectively, to crescent-shaped compartments 47 and 48 covering said openings and communicating with the central compartment. A discharge-pipe 50 depends from the bottom of compartment 47 into the regulating-box and a pipe 51 depends from the bottom of the compartment 48 to discharge preferably into the settling-tank. The dividing-box has journaled centrally in a stepped bearing 147 on the bottom of the central compartment a shaft 247 carrying a handle 347 on its upper end near which it is journaled in a spider 148 having diametrically opposite upper and lower arms secured at their outer ends to the inner wall of the compartment 46 and the intermediate arms carry on their outer ends an arc-shaped valve 248 adapted to be set by turning the shaft 247 at its handle to partially cover, more or less, the openings 146, 246 to proportion them and thereby suitably proportion the outflow through one to that through the other. The compartment 46 communicates through a pipe 49 with the smaller outlet-opening 18 in the bottom of the water-box 16.

With the apparatus started in its operation by water flowing through the pipe 14, the holder has been supplied with a charge of proper strength of the solution employed (as lime) in quantity sufficient to last for a predetermined number of hours. The escape of the water from the box 16 at its outlet 17 drives the wheel 19 to turn the shaft 20 for actuating the stirrer in the holder 22, which is shown to contain a partition 52 extending radially toward the shaft 24 above the holder-bottom to tend to check excessive undulation of the solution under the action of the stirrer, which would render irregular the outflow of solution into the lift-pipe at the receiving-opening in its free end. That portion of the raw water which escapes from the box 16 through its smaller opening 18 flows through the pipe 49 into the central compartment of the dividing-box 45, whence a part, suitably proportioned by the adjusted valve 248, runs into the compartment 47 and discharges through the pipe 50 into the regulating box 33 and the remainder runs into the compartment 48 and escapes as surplus through the pipe 51 into the tank 9. The box 33 holds the required quantity of water and the box 25 holds the required quantity of slaked lime to form, when their contents are run into the holder 22, a charge for the latter, and such contents may be so run, when the holder is emptied as hereinafter described, by raising the plug-valve 28 and opening the shut-off valve in a pipe 53 (Fig. 3) leading to the holder from an opening 54 (Fig. 2) in the bottom of the tank 33. The outflow of the solution through the lift-pipe 41 is properly proportioned to the outflow of water at the spouts 44 for treating the raw water, by the amount of water which runs into the regulating box from the opening 18 moving the float 37 to move with it the lift-pipe 41, so that the same amount of chemical solution flows out of the holder 22 as the amount of water entering the box 33 from said opening 18; and the relative disposition of these spouts impinges the streams from them against each other while the stream of solution from the spout 43 strikes them at a right-angle, thereby mixing the chemical and water to be treated in suspension in a manner to effect their thorough mixture before they enter the precipitating tank. As the level of liquid in the solution-holder falls under the outflow through the lift-pipe, the accumulation of hard water in the box 33 raises the float 37 in the same ratio to cause the same amount of solution to discharge from the box 22 as the predetermined amount of hard water that flows into the regulating box. When the solution-holder is emptied an attendant refills it with the contents of the slaker 25 and box 33 preferably by raising the plug-valve 29 and opening the valve in the pipe 34 to run the contents of the regulating box into the solution-holder through the slaker with the advantage of washing out of the latter the full charge of the chemical. Obviously, refilling the solution-holder raises the lift-pipe and lowers the float 37 to their initially normal relative positions to be raised again as the regulating-box fills and the solution-holder empties.

The outlet-opening 18 in the water-box might be sufficiently small for properly proportioning to the outflow from the solution-holder the flow of hard water into the regulating-box 33 through the pipe 49 without the use of any dividing-box, but that opening in an apparatus of small size would then have to be so small that it would clog with impurities from the water; so that to avoid such effect, which would impair the operation of the machine, the opening 18 is made too large to become thus clogged, and the surplus water fed through it is divided out by the dividing-box 45 which sends only the proper proportion into the box 33 for regulating the supply therein to the requirement for the solution-charge introduced at intervals, as described, into the holder 22.

It is sometime desirable to so automatically regulate the operation of the apparatus that it will run either at full capacity or stop altogether; and this is accomplished through the medium of a particular construction of float in the precipitating tank 9 suspended from the valve 15 in the water-pipe 14. The occasion for such regulation arises when less softened water is being used out of the tank 9 than is being treated in it, so that the water-level in the latter rises above the overflow 12. The purpose is then to arrest the operation of the machine until enough of the softened water has flowed for use out of the overflow to lower its level to the same, and thereupon start again the operation of the machine. To accomplish this result a well 55 (Fig. 7), open to the inflow of water, as through a series of holes 56 near its upper end, is stationarily supported in the precipitating tank to depend in its upper end, and it contains a float 57 on a rod 58 pivotally suspended on one end of a bent lever 59 fulcrumed at 60 near its opposite end, which is pivotally connected with the stem of the valve 15. In the bottom of the well 55 is an opening 61 having a pipe-connection 62 with the side of a vertical tubular chamber 63 forming a valve-seat 64 at its open lower end and having a vertical guide-pipe 65 rising from its upper end for the stem 66 of a supplemental float 67 below the chamber 63 and carrying a closing-valve or cap 68 about the stem near its junction with the float to fit against the seat 64 for closing the chamber. A stop 166 is provided adjustably on the upper end of the stem to sustain it against dropping through the sleeve. When the water-level in the precipitating tank rises above the overflow it raises the supplemental float against its seat to close the chamber 63 and thus close the outlet from the well 55, and the level soon rises to fill the liquid into the well through the holes 56 and raise the float to close the valve 15 and shut off the supply of water through the pipe. This obviously stops the operation of the machine until the level in the tank 9 falls sufficiently far to lower the supplemental float 67 and thereby open the chamber 63 to permit the discharge through it (and against the top of the supplemental float to assist the lowering action of its own gravity) of the contents of the well 55 and resultant lowering of the float 57 to re-open the valve 15 and continue the operation of the machine.

It will be understood from the foregoing description of the detailed construction and operation of the apparatus that my improvement, in its broadest sense, lies in the employment of a float-containing regulating-box to coöperate with suitable means on or in the solution-holder for properly proportioning to the outflow from the latter the flow of water into the regulating-box to cause such water to raise the float in the same ratio and produce the same amount of solution discharge as the predetermined amount of water that flows into the regulating box.

What I claim as new and desire to secure by Letters Patent is—

1. In a water-softening apparatus, the combination with a precipitating tank, of a box supported above said tank to receive the water to be treated and provided with a relatively large opening discharging to said tank and a smaller discharge-opening, a water-supply pipe discharging into said box, a chemical-solution holder discharging to said tank and provided with means for automatically proportioning the supply thereto of the solution, a regulating-box for the water for the solution and a box for holding the chemical therefor controllably communicating with said holder, and a water-dividing box communicating with said smaller opening and having discharge-openings leading respectively to the regulating box and outside the same.

2. In a water-softening apparatus, the combination with a precipitating tank, of a casing surmounting said tank and provided with a spout discharging thereto, a water-wheel journaled in said casing, a water-box surmounting said casing and provided with a relatively large discharge-opening and a smaller discharge-opening, a water-supply pipe discharging into said box, a chemical-solution holder discharging to said tank and provided with means for automatically proportioning the supply thereto of the solution, a stirrer in said holder geared to the water-wheel, a regulating box for the water for the solution and a box for holding the chemical therefor controllably communicating with said holder, and a water-dividing box communicating with said smaller opening and having discharge-openings leading respectively to the regulating box and outside the same.

3. In a water-softening apparatus, the combination with a precipitating tank, of a box supported above said tank to receive the water to be treated and provided with a relatively large opening discharging to said tank and a smaller discharge-opening, a water-supply pipe discharging into said box, a chemical-solution holder discharging to said tank and provided with means for automatically proportioning the supply thereto of the solution, a regulating box for the water for the solution and a box for holding the chemical therefor communicating one with the other and each having independently of the other controllable communication with said holder, and a water-dividing box communicating with said smaller opening and having discharge openings leading respectively to the regulating box and outside the same.

4. In a water-softening apparatus, the combination with a precipitating tank, of a box supported above said tank to receive the water to be treated and discharging to said tank, a water-supply pipe discharging into said box, a chemical-solution holder discharging to said tank, a box receiving a regulable proportion of the water supply, means connected with said holder for proportioning the discharge therefrom with relation to the amount of flow into the last mentioned box, and a float in said last mentioned box operatively connected with said proportioning means for the purpose set forth.

5. In a water-softening apparatus, the combination with a precipitating tank, of a box supported above said tank to receive the water to be treated and provided with a relatively large opening discharging to said tank and a smaller discharge-opening, a water-supply pipe discharging into said box, a chemical-solution holder discharging to said tank, means connected with said holder for proportioning the discharge therefrom, a regulating-box communicating with said smaller discharge-opening, and a float in the regulating-box operatively connected with said proportioning-means, for the purpose set forth.

6. In a water-softening apparatus, the combination with a precipitating tank, of a box supported above said tank to receive the water to be treated and provided with a relatively large opening discharging to said tank and a smaller discharge-opening, a water-supply pipe discharging into said box, a chemical-solution holder discharging to said tank, means connected with said holder for proportioning the discharge therefrom, a regulating-box, a dividing-box connected with said smaller discharge-opening and discharging to the regulating-box, and a float in the regulating box operatively connected with said proportioning-means, for the purpose set forth.

7. In a water-softening apparatus, the combination with a precipitating tank, of a box supported above said tank to receive the water to be treated and provided with a relatively large opening discharging to said tank and a smaller discharge-opening, a water-supply pipe discharging into said box, a chemical-solution holder having a discharge-spout leading to said tank, a lift-pipe in said holder connected with said spout for proportioning the discharge therefrom, a regulating box for the water for the solution and a box for holding the chemical therefor controllably communicating with said holder, a float-containing well in and communicating with the regulating box and provided with a superstructure equipped with guide-pulleys, a chain connecting said float and lift-pipe over said pulleys, and a water-dividing box communicating with said smaller opening and having discharge-openings leading respectively to the regulating box and outside the same.

8. In a water-softening apparatus, the combination with a precipitating tank, of a box supported above said tank to receive the water to be treated and provided with a relatively large opening discharging to said tank and a smaller discharge-opening, a water-supply pipe discharging into said box, a chemical-solution holder discharging to said tank and provided with means for automatically proportioning the supply thereto of the solution, a regulating box for the water for the solution and a box for holding the chemical therefor controllably communicating with said holder, and a water-dividing box supported above the regulating box and comprising a central compartment having openings and communicating with said smaller opening and side-compartments covering said openings with discharge-outlets leading from the side-compartments respectively to the regulating box and outside the same.

9. In a water-softening apparatus, the combination with a precipitating tank, of a box supported above said tank to receive the water to be treated and provided with a relatively large opening discharging to said tank and a smaller discharge-opening, a water-supply pipe discharging into said box, a chemical-solution holder discharging to said tank and provided with means for automatically proportioning the supply thereto of the solution, a regulating box for the water for the solution and a box for holding the chemical therefor controllably communicating with said holder, and a water-dividing box supported above the regulating box and comprising a central compartment having openings, a valve for regulating the size of said openings and provided with means for adjusting it, and side-compartments covering said openings and having discharge-outlets leading respectively to the regulating box and outside the same.

10. In a water-softening aparatus, the combination with a precipitating tank having an overflow, of a pipe for supplying to said tank water to be treated and provided with a valve, a solution-holder discharging to said tank, and a float-device in the upper part of said tank, comprising a well having a lower outlet and open at its upper portion to fill from said tank, a float in the well connected with said valve, a chamber having a pipe-connection with said lower outlet and an open lower end forming a seat, and a supplemental float supported to move relative to said seat for opening and closing said chamber to the precipitating tank, for the purpose set forth.

11. In a water-softening apparatus, the combination with a precipitating tank having an overflow, of a pipe for supplying to said tank water to be treated and provided with a valve, a solution-holder discharging to said tank, and a float-device in the upper part of said tank comprising a well having a lower outlet and open at its upper portion to fill from said tank, a float in the well having a stem, a lever connecting the float-stem with the stem of said valve, a chamber having a pipe-connection with said lower outlet and an open lower end forming a seat, a guide extending from said chamber, a stem movable in said guide and a supplemental float on the lower end of said guided stem to move relative to said seat for opening and closing said chamber to the precipitating tank, for the purpose set forth.

WM. McAFEE BRUCE.

In presence of—
  B. W. SEDWICK,
  Z. T. ADAMS.